(12) United States Patent
Wachtfogel et al.

(10) Patent No.: US 8,559,795 B2
(45) Date of Patent: Oct. 15, 2013

(54) MOBILE PERSONAL VIDEO RECORDER

(75) Inventors: Reuven Wachtfogel, Jerusalem (IL); Shabtai Atlow, Efrat (IL)

(73) Assignee: Cisco Technology Inc., San Jose, CA (US)

( * ) Notice: Subject to any disclaimer, the term of this patent is extended or adjusted under 35 U.S.C. 154(b) by 1369 days.

(21) Appl. No.: 11/628,677

(22) PCT Filed: Apr. 10, 2005

(86) PCT No.: PCT/IL2005/000383
§ 371 (c)(1),
(2), (4) Date: Jan. 18, 2007

(87) PCT Pub. No.: WO2005/125202
PCT Pub. Date: Dec. 29, 2005

(65) Prior Publication Data
US 2008/0267591 A1    Oct. 30, 2008

Related U.S. Application Data

(60) Provisional application No. 60/581,597, filed on Jun. 21, 2004.

(51) Int. Cl.
*H04N 5/76* (2006.01)
*H04N 5/782* (2006.01)

(52) U.S. Cl.
CPC ..................... *H04N 5/782* (2013.01)
USPC ........... 386/291; 386/239; 386/296; 386/362; 725/39; 725/46; 725/97; 725/139; 725/143; 725/153

(58) Field of Classification Search
CPC .......................... H04N 5/782; H04N 21/47214
USPC ........... 725/37, 38, 42, 44, 46, 135, 139–143, 725/151–153, 97; 386/213, 216, 219, 230, 386/234, 239, 248, 249, 262, 291, 296, 326, 386/353, 358–362
See application file for complete search history.

(56) References Cited

U.S. PATENT DOCUMENTS 5,214,514 A * 5/1993 Haberkern ..................... 386/359
6,637,029 B1 10/2003 Eilat et al.
(Continued)

FOREIGN PATENT DOCUMENTS

EP    1 087 398 A1    3/2001
EP    1 107 252 A2    6/2001
(Continued)

OTHER PUBLICATIONS

Dan Knight, "TiVo Points to Apple's Next Market" (Mac Musings, Oct. 10, 2002), available on the World Wide Web at www.lowendmac.com/musings/02/1010.html.
(Continued)

*Primary Examiner* — Thai Tran
*Assistant Examiner* — Mishawn Dunn
(74) *Attorney, Agent, or Firm* — Husch Blackwell LLP (57) ABSTRACT

A method of digital television recording including receiving a content item at a first Personal Video Recorder (PVR), determining whether to transfer the content item based, at least in part, on at least one of the following currentness of the content item, a user preference, and a user profile, and transferring the content item from the first PVR to a mobile PVR only upon a positive result of the determining. Related methods and apparatus are also disclosed.

26 Claims, 8 Drawing Sheets

(56) References Cited

U.S. PATENT DOCUMENTS

| | | | |
|---|---|---|---|
| 2001/0052130 A1 | 12/2001 | Yap et al. | |
| 2002/0044226 A1 | 4/2002 | Risi | |
| 2002/0131768 A1 | 9/2002 | Gammenthaler | |
| 2002/0147975 A1* | 10/2002 | Seo | 725/39 |
| 2002/0184224 A1* | 12/2002 | Haff et al. | 707/10 |
| 2003/0095791 A1 | 5/2003 | Barton et al. | |
| 2003/0149978 A1* | 8/2003 | Plotnick | 725/39 |
| 2003/0167318 A1 | 9/2003 | Robbin et al. | |
| 2005/0050578 A1* | 3/2005 | Ryal | 725/143 |
| 2005/0216942 A1* | 9/2005 | Barton | 725/97 |
| 2005/0271355 A1* | 12/2005 | Gilor | 386/46 |
| 2005/0283797 A1* | 12/2005 | Eldering et al. | 725/35 |
| 2006/0159109 A1* | 7/2006 | Lamkin et al. | 370/401 |
| 2007/0124761 A1* | 5/2007 | Chen et al. | 725/35 |
| 2007/0226365 A1* | 9/2007 | Hildreth et al. | 709/231 |
| 2011/0081127 A1* | 4/2011 | Bilbrey | 386/232 |

FOREIGN PATENT DOCUMENTS

| | | |
|---|---|---|
| EP | 1 387 281 A1 | 2/2004 |
| WO | WO 99/01984 | 1/1999 |
| WO | WO 00/01149 | 1/2000 |
| WO | WO 03/043322 A2 | 5/2003 |
| WO | WO 03/107672 A1 | 12/2003 |
| WO | WO 2004/112036 A1 | 12/2004 |
| WO | WO 2005/111853 A2 | 11/2005 |

OTHER PUBLICATIONS

Danny Ricci, "Apple: Above and Beyond the PVR" (My Turn—Your Opinion, Your Turn, Dec. 30, 2002), available on the World Wide Web at www.lowendmac.com/myturn/02/1230.html.

"The NDS Guide to Personal Television" (NDS Ltd. 2003).

"New TiVo® Service Release ushers in Era of 'TiVo to Go' Portable, Mobile TiVo Experience" (TiVo Press Release, Jan. 8, 2004).

New 'TiVo to Go' Portable, Mobile TiVo Service (Best Stuff PR Newswire, Jan. 8—year not indicated-), available on the World Wide Web at www.beststuff.com/article.php3?story id=6106.

Jun. 18, 2008 European Patent Office communication for EP 05 730 971.

Jul. 4, 2007 European Search Report for EP 05 730971.

Mar. 8, 2010 Office Communication in connection with prosecution of EP 05 730 971.8 (6 pgs).

Aug. 12, 2009 European Patent Office Communication for EP 05 730 971.8.

Aug. 27, 2012 Office Communication in connection with prosecution of EP 05 730 971.8.

* cited by examiner

MOBILE PERSONAL VIDEO RECORDER

The present application is a 35 U.S.C. §371 submission of International Application No. PCT/IL2005/000383, that was filed on 10 Apr. 2005, entitled "Mobile Personal Video Recorder" and published on 29 Dec. 2005 in the English language with International Publication No. WO 2005/125202 A2, and that claims the benefit of the filing date of U.S. provisional application Ser. No. 60/581,597, that was filed on 21 Jun. 2004 and that is hereby incorporated by reference.

FIELD OF THE INVENTION

The present invention relates to the field of personal video recorder devices (PVRs), and more specifically to mobile PVR devices.

BACKGROUND OF THE INVENTION

Portable and mobile devices supporting video and audio are well known and include webpads, tablet PCs, PDAs, and iPods.

Published US Patent Application 2003/0095791 of Barton et al. describes a communication system and a family of methods for remote access to personal television service. Within the system of Barton et al., a remote personal TV service center provides centralized program guide information. A user may access the personal TV service center through a digital video recorder that is connected to the personal TV service center via telephone modem or a network server. The user may access the personal TV service center through a remote computer terminal or a personal digital assistant that is connected to a computer network. The user selects program events and programs the digital video recorder by using a graphical user interface installed in the front panel of the digital video recorder in case of local programming, or using a similar GUI which is incorporated into the Web pages presented to remote users by a Web server in case of remote programming. The media stream stored in one digital video recorder may be transferred to another digital video recorder. For data security protection during data transfer, all communication are authenticated and encrypted.

An article published on the World Wide Web by Dan Knight, on 10 Oct. 2002, available at www.lowendmac.com/musings/02/1010.html, and a later article by Danny Ricci, dated 30 Dec. 2002, available at www.lowendmac.com/musings/02/1230.html describe how Apple Computer Inc. can design a product utilizing Apple's OS X to power a personal video recorder which is completely integrated with other commercially available Apple Computer products, such as iSync, iphoto, iMovie, and iPod.

An article on the World Wide Web available at www.beststuff.com/article.php3?story_id=6106, dated January 8 (year not indicated) describes an as yet unreleased product enabling TiVo subscribers with Home Media Option to be able to move their favorite programs stored on a TiVo PVR to a laptop for viewing on the road, or to any PC. For those who have a PC equipped with a DVD burner, programs can then be burned to DVD.

U.S. Pat. No. 6,637,029 to Maissel et al. describes a subscriber unit for use in a television system including a television network and transmitting apparatus for transmitting program schedule information, the subscriber unit including a receiving unit for receiving the program schedule information, a profile storage unit for storing at least one viewer preference profile of at least one television viewer, an intelligent agent for customizing the program schedule information based, at least in part, on the viewer preference profile, to produce a program guide including customized program schedule information, and display apparatus for displaying the program guide. The disclosure of U.S. Pat. No. 6,637,029 is hereby incorporated herein by reference.

Published PCT Patent Application WO 00/01149 of NDS Ltd., and corresponding U.S. patent application Ser. No. 09/515,118, describe a digital recording method comprising: broadcasting a television program associated with a broadcaster set of parameters enabling access to a first set of predetermined portions of the program; operating an agent for determining whether to record the program and for associating with the program, upon recording of the program, an agent set of parameters enabling access to a second set of predetermined portions of the program; storing the program together with the broadcaster set of parameters and the agent set of parameters to generate an addressable program; displaying the at least a portion of the addressable program to a user; receiving from the user a user set of parameters enabling access to a third set of predetermined portions of the addressable program; editing the addressable program to include the user set of parameters enabling access to the third set of predetermined portions of the addressable program thereby generating an edited addressable program; and storing the edited addressable program. The disclosures of WO 00/01149 and corresponding U.S. application Ser. No. 09/515,118, are hereby incorporated herein by reference.

The NDS Guide to Personal TV, copyright 2003 by NDS Limited, One London Road, Staines, Middlesex, United Kingdom, describes personal TV, Personal Video Recorders (PVRs), revenue generating opportunities created by PVRs and personal TV, as well as targeted advertisements.

The disclosures of all references mentioned above and throughout the present specification, as well as the disclosures of all references mentioned in those references, are hereby incorporated herein by reference.

SUMMARY OF THE INVENTION

The present invention, in preferred embodiments thereof, seeks to provide an improved system allowing mobility of content. The present invention, in preferred embodiments thereof, comprises a mobile disk and a display. Content is transferred, in a process preferably transparent to users, from a base Personal Video Recorder (PVR) to a device constructed in accordance with a preferred embodiment of the present invention. A user is then able to take the device with him and watch the recorded programs. When the user returns home, the device is synchronized again with the base PVR. After synchronizing, the device is ready to be used in a mobile manner again. Synchronization occurs according to a set of criteria preferably based on at least one of the following:
  currentness of the content item;
  a user preference; and
  a user profile.
The content item is then transferred from the base PVR to the device.

The term "synchronization", as used in the present disclosure, in all of its grammatical forms, is understood to mean the process of:
  updating the Electronic Program Guide;
  updating conditional access information; and
  transferring content from the base PVR to the device.

The term "data", as used in the present disclosure, in all of its grammatical forms, is understood to refer to items comprising, but not limited to, content items, electronic program guide (EPG) data, and metadata.

The term "data port", as used in the present disclosure, in all of its grammatical forms, is understood to be referring to a port which is sometimes operative to receive data.

It is appreciated that in the present specification and claims the term "user preference" in all of its grammatical forms is understood to mean an express choice or selection made by the user expressing a preference.

In the present specification and claims the terms "mobile" and "mobile video" in all of their grammatical forms are distinguished from the terms "portable" and "portable video". "Portable video" is video comprised on a storage device. "Mobile video" is video comprised on a storage device with an integrated viewing system. For example, and without limiting the generality of the foregoing, "portable video" provides the ability to take recorded content and watch it on the television of choice (such as, DVD rental). Someone may not care to watch TV while bumping down the highway, but that same person may want to watch a movie over at a friend's house or lend his father a DVD disc. By contrast, mobile video is a convenient way to take at least a portion of a person's stored content to another location.

There is thus provided in accordance with a preferred embodiment of the present invention receiving a content item at a first Personal Video Recorder (PVR), determining whether to transfer the content item based, at least in part, on at least one of the following currentness of the content item, a user preference, and a user profile, and transferring the content item from the first PVR to a mobile PVR only upon a positive result of the determining.

Further in accordance with a preferred embodiment of the present invention the determining is based, at least in part, on currentness of the content item.

Still further in accordance with a preferred embodiment of the present invention the determining is based, at least in part, on the user preference.

Additionally in accordance with a preferred embodiment of the present invention the determining is based, at least in part, on the user profile.

Moreover in accordance with a preferred embodiment of the present invention at least one of the following is stored in the first PVR the user preference, and the user profile.

Further in accordance with a preferred embodiment of the present invention the transferring occurs without user intervention.

Still further in accordance with a preferred embodiment of the present invention the transferring occurs in response to a user initiated request.

Additionally in accordance with a preferred embodiment of the present invention the user preference includes a plurality of individual user preferences.

Moreover in accordance with a preferred embodiment of the present invention the mobile PVR includes a plurality of individual mobile PVRS.

Further in accordance with a preferred embodiment of the present invention the mobile PVR includes a television tuner.

Still further in accordance with a preferred embodiment of the present invention an electronic program guide (EPG) cached on the mobile PVR.

Additionally in accordance with a preferred embodiment of the present invention the EPG is updateable in at least one of the following ways wirelessly, and over a cable.

Moreover in accordance with a preferred embodiment of the present invention the EPG is used to book at least one of a program, and a series of programs.

Further in accordance with a preferred embodiment of the present invention a booking request is transferred to the first PVR.

Still further in accordance with a preferred embodiment of the present invention the mobile PVR includes a wireless remote control communication port, and also including a remote control device, the wireless remote control communication port being operative to communicate with the remote control device.

Additionally in accordance with a preferred embodiment of the present invention the wireless remote control communication port is an infra-red communication port.

Moreover in accordance with a preferred embodiment of the present invention the content item includes an advertisement.

Further in accordance with a preferred embodiment of the present invention the first PVR includes a plurality of individual first PVRs.

There is also provided in accordance with a another preferred embodiment of the present invention a first device including a first data storage unit operative to store received content items, a second device including a second data storage unit, the data stored in the second data storage unit being episodically synchronized with the data stored on the first data storage unit, and an alarm mechanism operative to present a reminder that the second device should be synchronized, before a specific date, with the first device, and an episodic synchronizer operative to episodically synchronize the data stored in the second data storage unit with the data stored on the first data storage unit.

Further in accordance with a preferred embodiment of the present invention the reminder includes an alarm.

Still further in accordance with a preferred embodiment of the present invention the alarm includes an on-screen display.

Additionally in accordance with a preferred embodiment of the present invention at least one of the following includes a Personal Video Recorder (PVR) the first device, and the second device.

Moreover in accordance with a preferred embodiment of the present invention at least one content item stored in the second data storage unit is associated with metadata indicating the specific date.

Further in accordance with a preferred embodiment of the present invention the metadata includes an indication of the specific date.

There is also provided in accordance with a still another preferred embodiment of the present invention a data port operative to receive data from a base PVR device, a data storage unit operative to store the data, and an episodic synchronizer operative to episodically synchronize data stored in the base PVR and the data stored in the data storage unit.

Further in accordance with a preferred embodiment of the present invention the data port includes a wireless data port.

Still further in accordance with a preferred embodiment of the present invention the data port includes a data port operative to receive data transmitted over a cable.

Additionally accordance with a preferred embodiment of the present invention an IR port operative to communicate with a remote control device.

Moreover in accordance with a preferred embodiment of the present invention a rechargeable battery, the rechargeable battery providing power to the mobile PVR.

Further in accordance with a preferred embodiment of the present invention a retractable kick-stand, the retractable kick-stand being arranged to support the mobile PVR when the retractable kick-stand is not retracted.

Still further in accordance with a preferred embodiment of the present invention a retractable looping wire, the retractable looping wire being arranged to enable hanging the mobile PVR.

Additionally in accordance with a preferred embodiment of the present invention a heat dissipation system, the heat dissipation system operative to dissipate heat generated during operation of the mobile PVR.

Moreover in accordance with a preferred embodiment of the present invention if the mobile PVR is at least one of in recording mode, and running on batteries, the mobile PVR turns itself off when a particular level of battery charge is reached.

Further in accordance with a preferred embodiment of the present invention the particular level of battery charge is configurable.

Still further in accordance with a preferred embodiment of the present invention a content storage governor operative to determine whether the mobile PVR is at least one of in recording mode, and running on batteries, and compute viewing time remaining, based, at least in part, on remaining battery charge and prevent the mobile PVR from storing additional content if the duration of the content to be recorded is longer than viewing time remaining in light of battery charge remaining.

Additionally in accordance with a preferred embodiment of the present invention the particular level of battery charge is determined, at least in part, so as to guarantee a predetermined amount of playback time on the mobile PVR.

There is also provided in accordance with a still another preferred embodiment of the present invention a first Personal Video Recorder (PVR) operative to receive a content item, the first PVR including, a determining unit on the first PVR operative to determine whether to transfer the content item based on at least one of the following currentness of the content item, a user preference, and a user profile, and a content item transferer operative to transfer the content item from the first PVR to a mobile PVR only upon a positive result of the determining.

There is also provided in accordance with a still another preferred embodiment of the present invention receiving content items at a first device, storing the received content items, episodically synchronizing data stored in a second device with data stored on the first device, and sending an alarm on the second device, the alarm including a reminder that the second device should be synchronized, before a specific date, with the first device.

There is also provided in accordance with a still another preferred embodiment of the present invention receiving data from a base PVR device at a data port, store the data in a data storage unit, and episodically synchronizing the data on the base PVR and the data stored in the data storage unit.

There is also provided in accordance with a still another preferred embodiment of the present invention a second remote control device having an arrangement of controls identical to the first remote control device, the second remote control device being scaled in size to between 75% and 85% percent of the first remote control device.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1A:
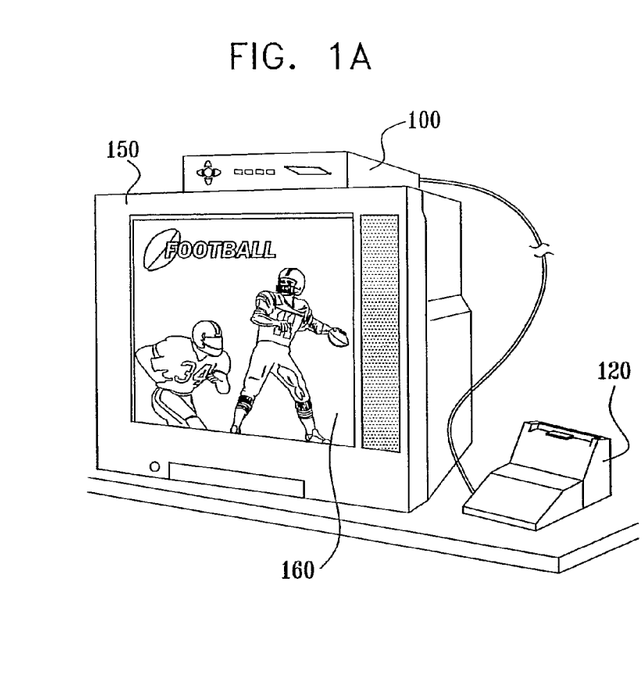
FIGS. 1A and 1B are simplified pictorial illustrations of a mobile personal video recorder (PVR) system constructed and operative in accordance with a preferred embodiment of the present invention.
Figure 1B:
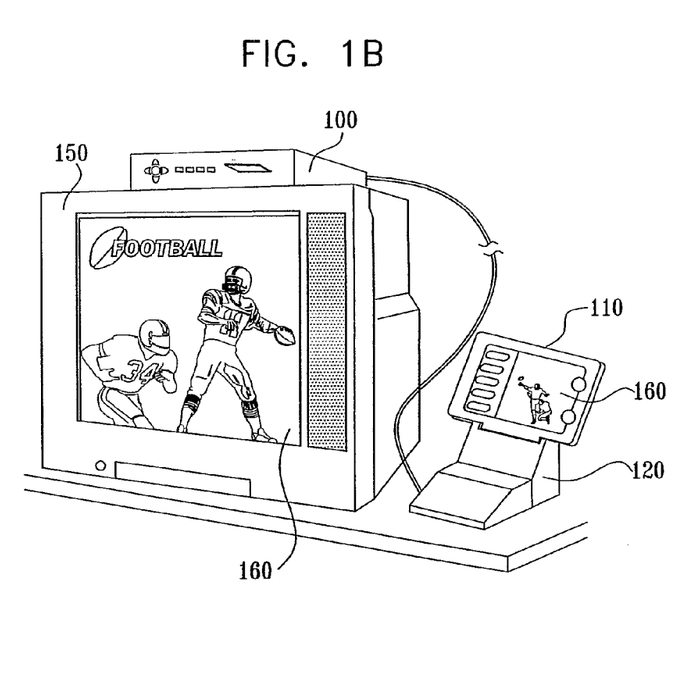

Reference is now made to FIGS. 1A and 1B, which are simplified pictorial illustrations of a mobile personal video recorder (PVR) system constructed and operative in accordance with a preferred embodiment of the present invention. The system of FIGS. 1A and 1B comprises a base PVR 100 and a mobile PVR 110. A cradle 120, for synchronizing the mobile PVR 110 with the base PVR 100, is depicted as connected to the base PVR 100. Although the cradle is depicted in FIGS. 1A and 1B, as explained below, there are several alternative methods for synchronizing the mobile PVR 110 with the base PVR 100.

The base PVR 100 is depicted, by way of example only, as resting on a television set 150. A football game 160 is seen on the television 150. The same football game 160 is also seen on the mobile PVR 110, when the mobile PVR is docked in the cradle 120.

Figure 2:
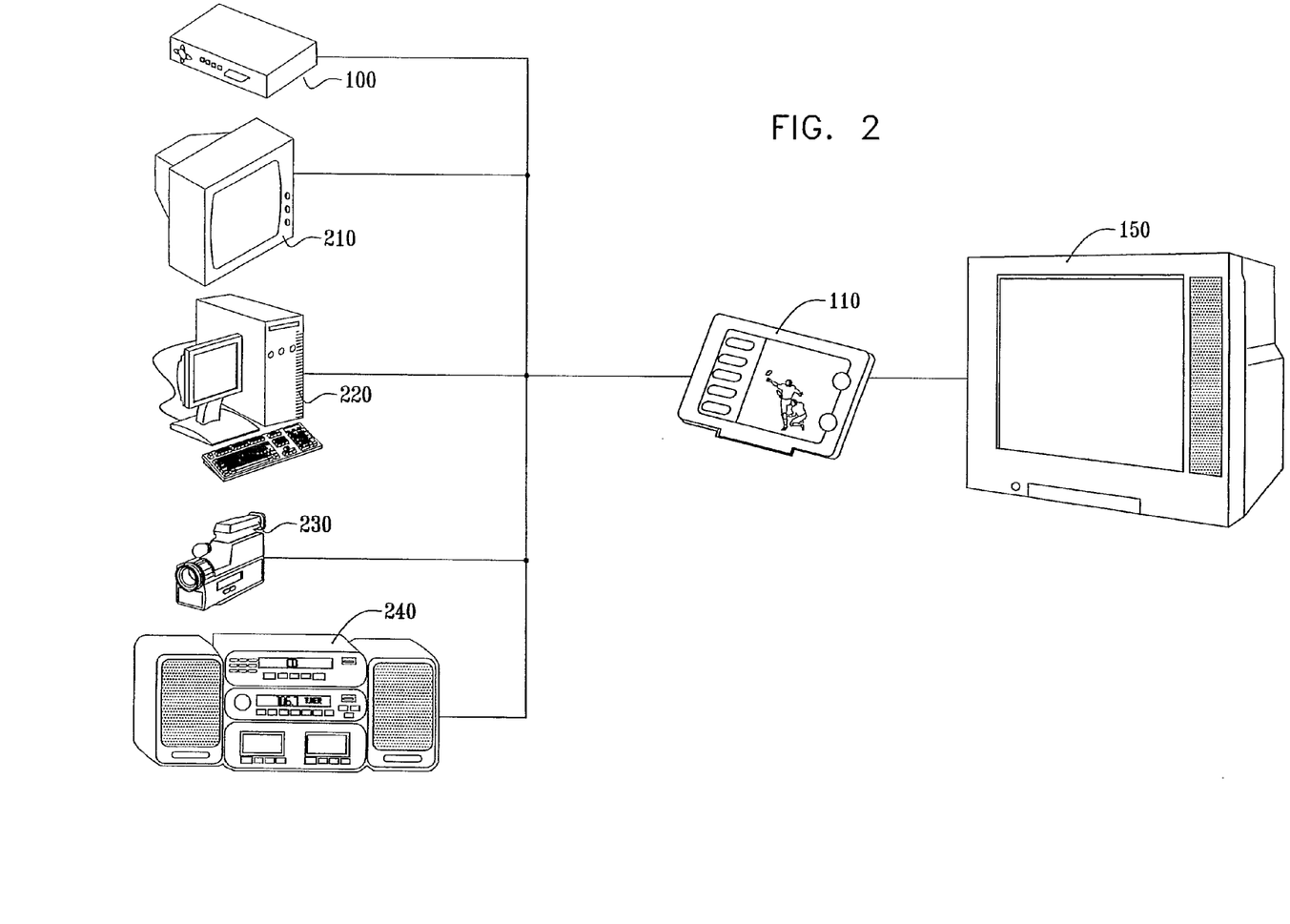
FIG. 2 is a simplified pictorial illustration of several alternative preferred embodiments of the mobile PVR system of FIGS. 1A and 1B.

Reference is now made to FIG. 2, which is a simplified pictorial illustration of several alternative preferred implementations of the mobile PVR system of FIGS. 1A and 1B. The devices depicted on the left side of FIG. 2 represent various sources of inputs to the mobile PVR 110. For example, and without limiting the generality of the foregoing, input may preferably be from the base PVR 100, as mentioned above. Typically, the input from the base PVR 100 preferably comprises content provided by a broadcaster, a content owner, or a content provider. Video may be preferably recorded on the mobile PVR 110 from a television 210. Video, music, and photos may preferably be copied to the mobile PVR 110 from a computer 220. Video and photos may preferably be copied to the mobile PVR 110 from a digital camcorder 230. Music may preferably be copied to the mobile PVR 110 from a stereo 240. Other appropriate inputs may be copied to the mobile PVR 110 from an appropriate device. Similarly, content may be copied from the mobile PVR 110 to an appropriate device.

Copying content may preferably occur using any appropriate protocol, for example, and without limiting the generality of the foregoing, USB, Ethernet, Bluetooth, or direct connection between the mobile PVR 110 and the device. The mobile PVR 110 may preferably output video to a television 150. Audio output may be via an internal speaker, or, alternatively, via an appropriate jack to speakers (not depicted) or headphones (not depicted).

Figure 3:
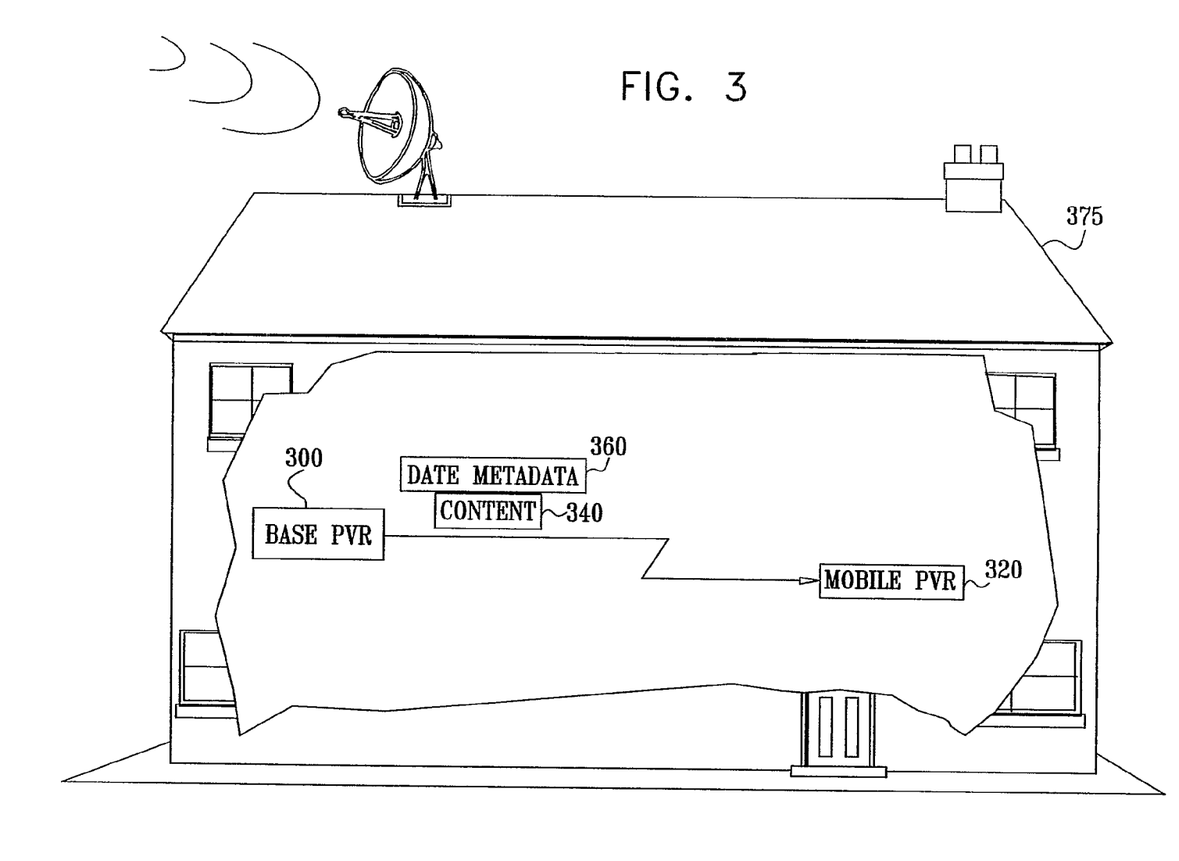
FIG. 3 is a simplified partly pictorial, partly block diagram illustration of the mobile PVR of FIGS. 1A and 1B synchronizing with a base PVR.

Reference is now made to FIG. 3, which is a simplified partly pictorial, partly block diagram illustration of the mobile PVR of FIGS. 1A and 1B synchronizing with a base PVR 300. As mentioned above, the system of FIGS. 1A and 1B also comprises the content item 340 and the unit of date metadata 360. The content item 340 and the unit of date metadata 360 are shown in transit from the base PVR 300 to the mobile PVR 320 for illustrative purposes only. The components depicted as comprising the system of FIGS. 1A and 1B are shown all comprised within the walls of a house 375. It is appreciated that the house 375 is shown by way of example only. The system of FIGS. 1A and 1B can be physically located in any suitable or appropriate place where communication can be established between the base PVR 300 and the mobile PVR 320.

It is appreciated that the synchronization of the mobile PVR 320 with the base PVR 300 may occur wirelessly or over a cable. It is further appreciated that the synchronization of the mobile PVR 320 with the base PVR 300 may occur without user invention or, alternatively, in response to a user initiated request.

Figure 4:
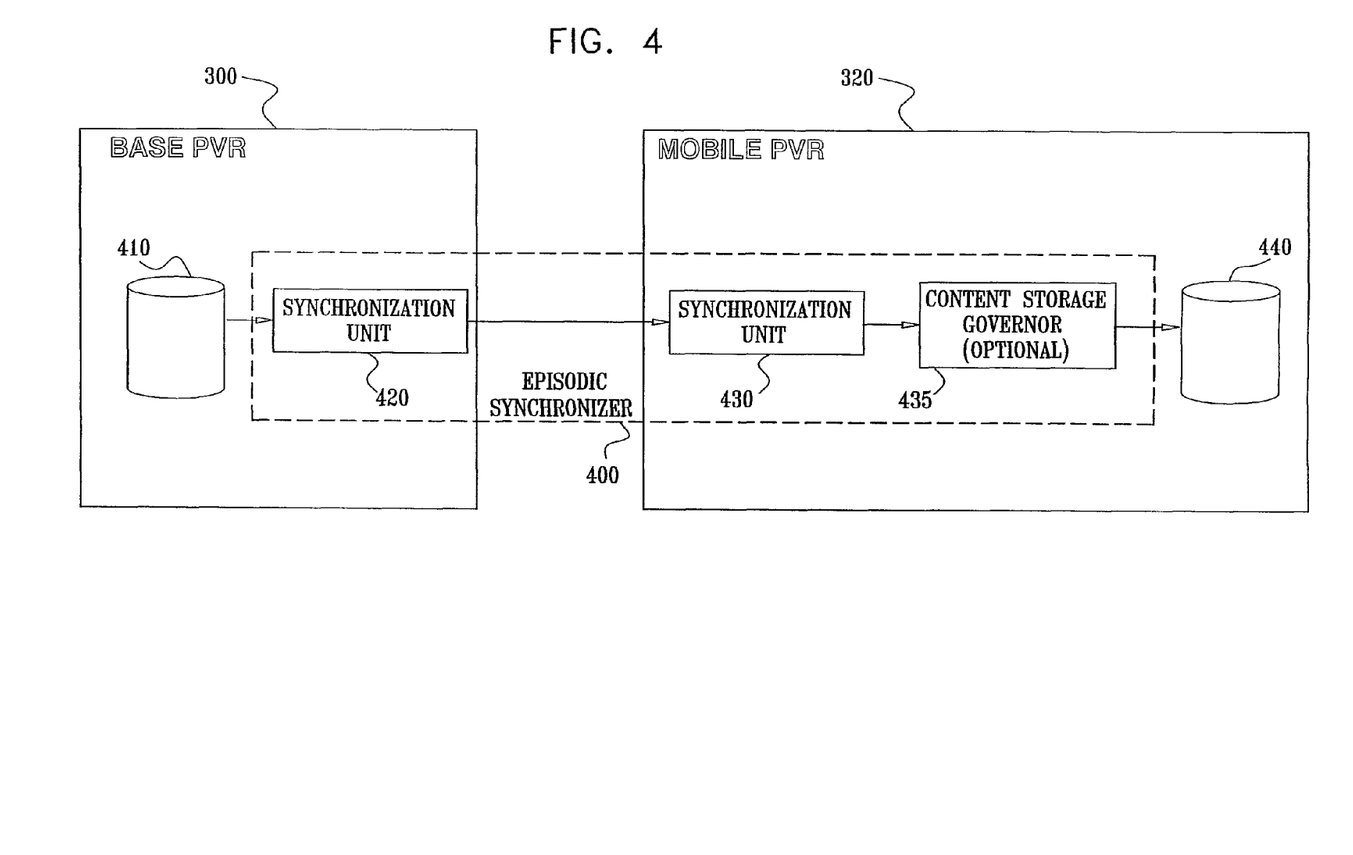
FIG. 4 is a simplified block diagram illustration of a preferred implementation of a portion of the system of FIGS. 1A and 1B.

Reference is now additionally made to FIG. 4, which is a simplified block diagram illustration of a preferred implementation of a portion of the system of FIGS. 1A and 1B. As explained above, synchronization occurs episodically between the base PVR 300 and the mobile PVR 320. The base PVR 300 and the mobile PVR 320 each comprise a portion of the episodic synchronizer 400. The base PVR 300 further comprises a storage unit 410, on which content items are stored. The episodic synchronizer 400 comprises a base PVR synchronization unit 420, which is comprised in the base PVR 300, a mobile PVR synchronization unit 430, which is comprised in the mobile PVR 320, and, optionally, a content storage governor 435. The base PVR synchronization unit 420 and the mobile PVR synchronization unit 430 are in communication with each other, as described above. When the episodic synchronizer 400 determines that a particular content item needs to be synchronized between the base PVR 300 and the mobile PVR 320, the content item is copied off of the base PVR 300 storage unit 420, and sent to the base PVR synchronization unit 420. The base PVR synchronization unit 420 sends the content item to the mobile PVR synchronization unit 430. Upon receipt of the content item, the mobile PVR synchronization unit 430 copies the content item to a storage unit 440 comprised on the mobile PVR 320.

In some preferred embodiments of the present invention, the mobile PVR synchronization unit 430 additionally comprises the content storage governor. The content storage governor, as explained below with reference to FIG. 6, preferably determines whether the mobile PVR is at least one of in recording mode and running on batteries, and preferably prevents the mobile PVR from storing additional content if the duration of the content to be recorded is longer than viewing time remaining in light of battery charge remaining.

Returning now to the discussion of FIG. 3, in one preferred embodiment of the present invention the most recent content items would be stored on both the base PVR 300 and the mobile PVR 320. As is well known in the art, as content is received at the base PVR 300, the content is stored temporarily in buffers, referred to as "record buffers". The present invention, in preferred embodiments of the present invention thereof, is preferably optimized to record the content from the record buffers comprised in the base PVR 300 onto data storage disks on both PVRs 300, 320 simultaneously. The optimization is preferably the default operation of preferred embodiments of the present invention.

It is appreciated that, in some preferred embodiments of the present invention, content items are transferred from the base PVR 300 to the mobile PVR 320 based at least one of:
currentness of the content item;
a user preference; and
a user profile.

The user profile is a collection of data about the user stored on the base PVR 300. The "currentness" of a content item is a measure of how recently that particular content item was stored on the base PVR as opposed to other content items. In some preferred embodiments of the present invention, currentness may preferably be configurable. For example, and without limiting the generality of the foregoing, the user profile may specify that content stored on the base PVR 300 in the past day, or alternatively, the past week, or alternatively, the previous fortnight may preferably be transferred from the base PVR 300 to the mobile PVR 320

User profile may be used as a criterion to determine content to be transferred from the base PVR 300 to the mobile PVR 320 preferably based on at least one of the following:

1. Information about preferences of individual users in a household. For example, and without limiting the generality of the foregoing, the base PVR 300 may have accrued information about purchase and/or recording history of the user. Furthermore, the user may have earlier taken appropriate steps to define the user's own profile.

2. Overt and covert intelligent agents, as are well known in the art, where an overt intelligent agent explicitly polls the user in order to gather information about the user, and where covert agents determine information about the user without user intervention. U.S. Pat. No. 6,637, 029 describes a system employing intelligent agents to customize program schedule information based, at least in part, on the viewer preference profile, to produce a program guide including customized program schedule information, and display apparatus for displaying the program guide. Published PCT Patent Application WO 00/01149 describes, inter-alia, the use of agents for determining whether or not to record a given television program.

3. Groups to which the user is known to belong. For example, and without limiting the generality of the foregoing, content may be transferred based on where the user lives, what age children the user may have, or the user's income or occupation.

4. Broadcaster requirements. For example, and without limiting the generality of the foregoing, a broadcaster may prefer to push revenue generating content to a mobile PVR 320.

5. Content which has been partially watched on the base PVR 300 may be preferentially transferred to the mobile PVR 320. For example, and without limiting the generality of the foregoing, if 37 minutes of a two hour movie have been viewed, the movie may be preferentially transferred to the mobile PVR 320.

It is appreciated that the base PVR 300 may also have a record of which of a plurality of mobile PVR devices are associated with specific users. Programs of interest may be transferred from the PVR 300 to the appropriate ones of the plurality of mobile PVR devices. For example, and without limiting the generality of the foregoing, an individual user may have a specific folder on the base PVR 300 for storing personal content. The personal content may be transferred to the appropriate one of the plurality of mobile PVR devices upon synchronization.

Figure 5:
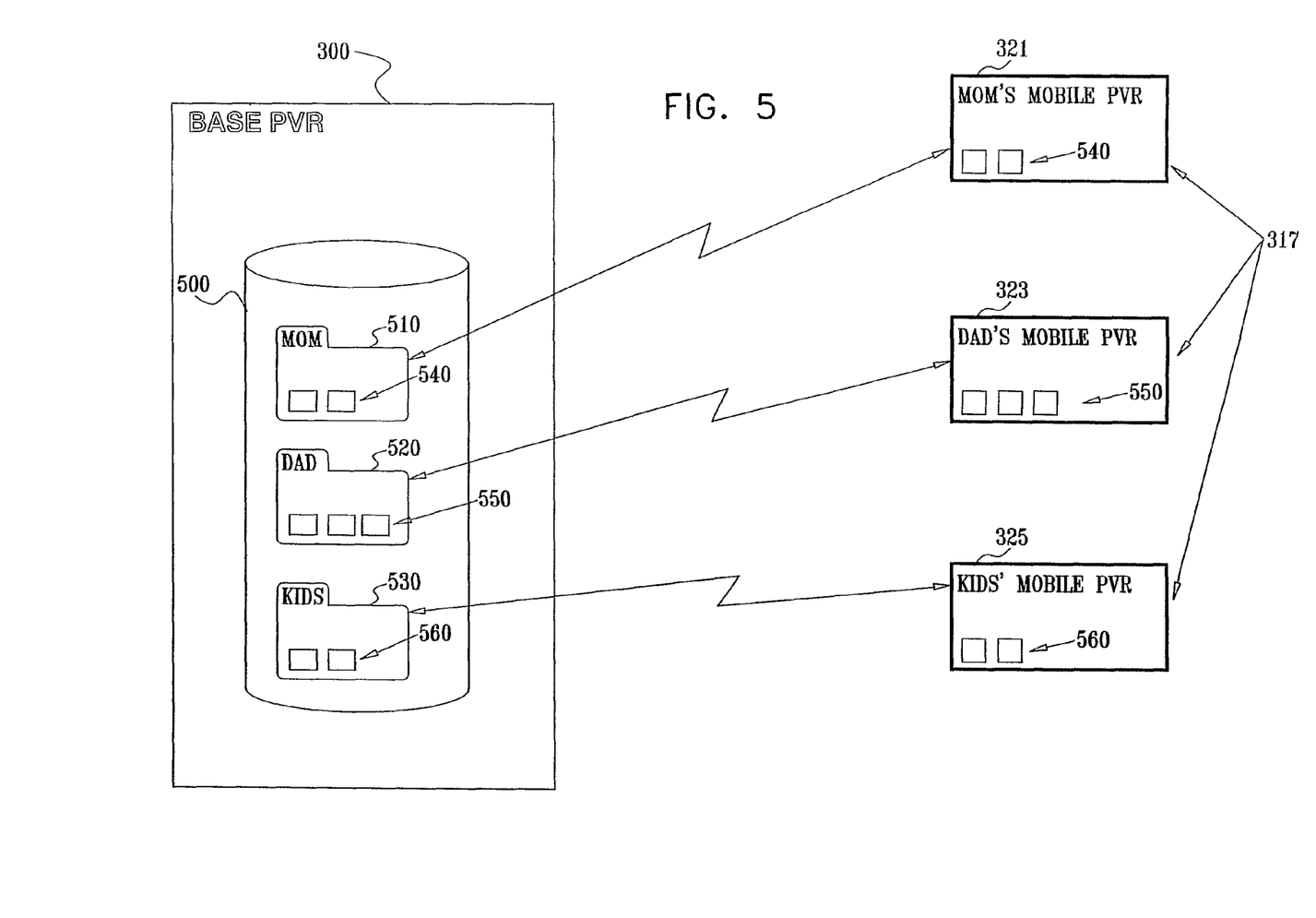
FIG. 5 is a simplified block diagram illustration of a preferred implementation of a plurality of mobile PVRs of FIGS. 1A and 1B synchronizing with the base PVR.

Reference is now additionally made to FIG. 5, which is a simplified block diagram illustration of a preferred implementation of a plurality of mobile PVRs 317 of FIGS. 1A and 1B (each of which may be similar to the mobile PVR 110 of FIGS. 1A and 1B) synchronizing with the base PVR 300. Although FIG. 5 depicts a plurality of mobile PVRs 317 all synchronizing with the base PVR 300, it is appreciated that, depending, at least, on resources available at any given time, there may be one, more, or no mobile PVRs 317 synchronizing with the base PVR 300. The base PVR 300 is depicted comprising a storage unit 500. The storage unit 500, typically a hard disk drive, preferably comprises a plurality of folders. As depicted in FIG. 5, there typically are folders associated with each user in a household. For example, FIG. 5 depicts three folders comprised on the storage unit 500, one folder for Mom 510, one folder for Dad 520, and one folder for kids 530. The folder for Mom 510 comprises a plurality of content items 540 which preferably will be synchronized so as also to be comprised on Mom's mobile PVR 321. The folder for Dad 520 comprises a plurality of content items 550 which preferably will be synchronized so as also to be comprised on Dad's mobile PVR 323. The folder for Kids 510 comprises a plurality of content items 560 which preferably will be synchronized so as also to be comprised on the Kids' mobile PVR 325.

Once it is determined, as explained above, that a particular content item is to be transferred to a particular user's mobile PVR among the plurality of mobile PVRs 317, that content item is copied into the folder associated with that particular user. It is appreciated that certain content items may be copied into more than one folder associated with particular users. For example, and without limiting the generality of the foregoing:

- a science documentary may be copied into the folder for Mom 510 and the folder for kids 530;
- a baseball game may be copied into the folder for Dad 520 and the folder for kids 530;
- the nightly news may be copied into the folder for Mom 510 and the folder for Dad 520; and
- the latest music videos may be copied into the folder for kids 530.

Returning now to the discussion of FIG. 3, it is appreciated that the mobile PVR 320 may preferably be associated with more than one base PVR 300, and thus may preferably receive transferred content from each base PVR with which the mobile PVR 320 is associated. It is also appreciated that the mobile PVR 320 may preferably be associated with more than one user. Content for each user of the mobile PVR 320 may be preferably transferred to the mobile PVR. For example, and without limiting the generality of the foregoing, a family may have one mobile PVR 320 for use by all of the family's children. Content for all of the children may then preferably be transferred onto the mobile PVR.

It is further appreciated that, in addition to program content, advertisements may be sent out, in a directed fashion, to users based on user profile.

In preferred embodiments where the mobile PVR 320 is able to decrypt content protected by conditional access encryption schemes, the mobile PVR 320 preferably uses a non-smart card based decryption system; such systems are well-known in the art. Alternatively, the mobile PVR 320 is equipped to hold a smart card, enabling smart card based decryption.

The mobile PVR 320 is preferably provided with an appropriate man-machine interface (for example, and without limiting the generality of the foregoing, a hand-held, infrared remote control device) and a graphical user interface, such as an electronic program guide (EPG), substantially identical to that of the base PVR 300. When a viewer books a program or series of programs using the mobile PVR 320 EPG, the viewer doing the booking may imply a desire for the booked program or series to be given higher priority disk space on the mobile PVR 320. If the viewer deletes a program on the mobile PVR 320, the program should preferably not be copied to the mobile PVR 320 again, without specific instructions of the viewer.

It is appreciated that, in some preferred embodiments of the present invention, a viewer can use the mobile PVR 320 to watch live TV (as depicted in FIG. 1B). Furthermore, with appropriate middleware, the mobile PVR 320 is preferably capable of running interactive television applications. However, in some preferred embodiments, the mobile PVR 320 does not have a television tuner, and thus it would preferably need to use the base PVR's 300 television tuner in order to watch live TV. Thus, while the mobile PVR 320 is not physically connected with the base PVR 300, live TV and some interactive television applications may not be available on the mobile PVR 320. It is appreciated, alternatively, that, in some preferred embodiments of the present invention, the mobile PVR 320 may comprise a television tuner, thus enabling viewing live TV and running interactive television applications.

It is also appreciated that, in those preferred embodiments of the present invention which do not comprise their own tuner, when the mobile PVR 320 is not connected, either over a cable or wirelessly, to the base PVR 300, the mobile PVR 320 EPG no longer supports live tuning, and thus access to an up-to-date version of the EPG is not possible. However, access to the EPG is preferably provided from a disk cache and the viewer should preferably be able to book recording as usual. Any appropriate protocol in use, wired or wireless, for synchronizing devices, is preferably used for both updating the EPG on the mobile PVR 320. Any appropriate standard synchronization method known in the art preferably may be used to enable synchronizing the base PVR 300 with the mobile PVR 320. It is appreciated that, if there is insufficient bandwidth to include content, there may be circumstances where only the cached EPG is updated during synchronization.

After booking a program or series of programs on the mobile PVR 320, during synchronization, the mobile PVR preferably sends the booking request to the base PVR 300, so that the base PVR may preferably record the desired program or series of programs.

Figure 6:
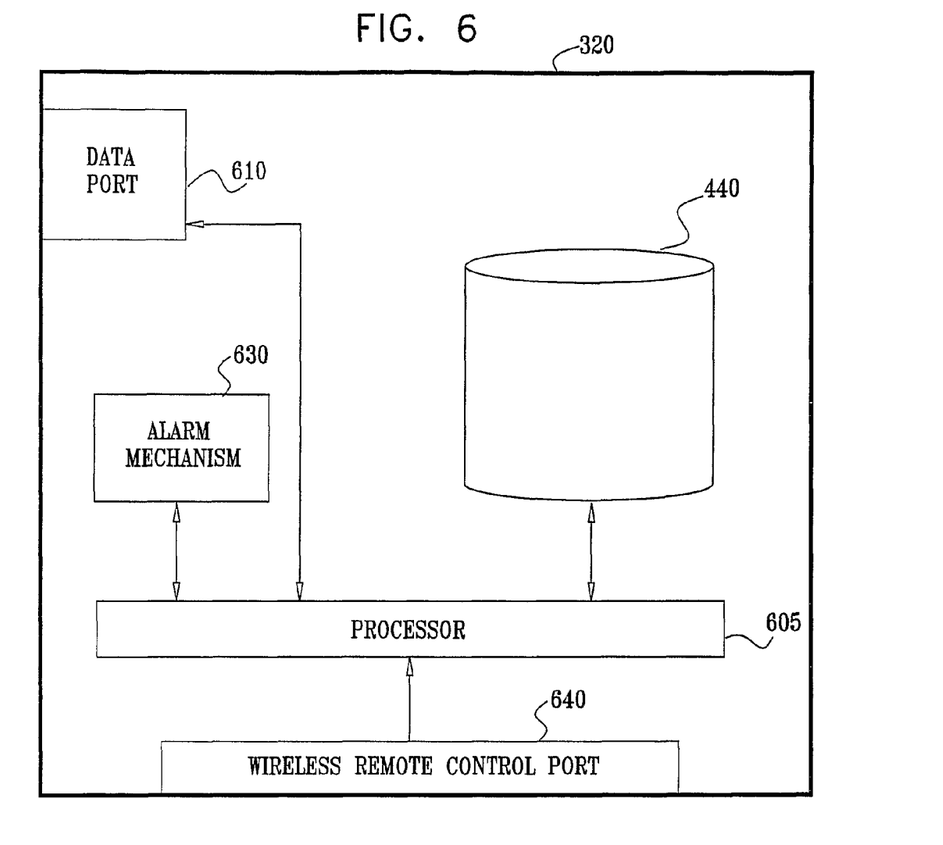
FIG. 6 is a simplified block diagram illustration of a preferred implementation of the mobile PVR of FIGS. 1A and 1B.

Reference is now additionally made to FIG. 6, which is a simplified block diagram illustration of a preferred implementation of the mobile PVR 320 of FIGS. 1A and 1B. The mobile PVR 320 comprises a storage unit 440, typically a hard disk drive. Content which has been transferred to the mobile PVR 320 is stored in the storage unit 440. The mobile PVR 320 also comprises a data port 610 which is operative to receive data to be stored in the storage unit 440. It is appreciated that the data port 610 may comprise a plurality of data ports, at least one of each of the plurality of data ports being adapted for a different communication protocol. For example, and without limiting the generality of the foregoing, at least one data port may comprise a blue tooth data port, while a second data port may comprise a direct cable connection to the base PVR 300. The storage unit 440, the data port 610, the alarm mechanism 630, and the wireless remote control port are all in communication with a processor 605, which, at least, manages data flow through the mobile PVR 320.

The mobile PVR 320 preferably comprises an alarm mechanism 630 operative to raise synchronization alarms, as explained above. In addition, the mobile PVR preferably comprises a wireless remote control port, for communication with a wireless remote control device, as explained below.

Returning now to the discussion of FIG. 3, in certain preferred embodiments of the present invention, the mobile PVR 320 EPG provides a reminder (for example, and without limiting the generality of the foregoing, a warning alarm and/or an on-screen display) that the mobile PVR 320 must be synchronized by a certain time in order to execute a requested recording. It is appreciated that when the mobile PVR 320 is re-synchronized with the base PVR 300, there may be one or more conflicts requiring viewer resolution. For example, and without limiting the generality of the foregoing, if a program was booked on the base PVR 300 and a different program was booked on the mobile PVR, both programs being booked for the same date and time, a conflict would arise requiring viewer resolution.

The mobile PVR 320 preferably comprises a port 640 (FIG. 6) adapted to receive signals from a wireless remote control. For example, and without limiting the generality of the foregoing, an infra-red (IR) port. The mobile PVR 320 therefore is preferably able to operate with a full-featured base PVR 300 remote control device. In some preferred embodiments, a scaled down remote control device is preferably available, to fit with the mobile PVR 320 mobility/portability theme. For example, and without limiting the generality of the foregoing, the scaled down remote control device may be only 80% of the size of the full-featured base PVR 300 remote control device. In some preferred embodiments of the present invention, the main buttons of the remote control device (for example, and without limiting the generality of the foregoing, the buttons of the remote control device, not including the numeric-digit buttons) are preferably also arranged in one or two columns at the left and/or right of the mobile PVR 320 faceplate. The viewer who is holding the mobile PVR 320 display from the sides preferably has easy access to the buttons using only the user's thumbs. The buttons on the mobile PVR 320 preferably look like the buttons on the base PVR 300 remote control device. It is appreciated that making the buttons on the mobile PVR 320 look like the buttons on the base PVR 300 remote control device should not be done at the expense of screen real-estate, size, shape, look and feel, and ease of access while holding the mobile PVR 320.

In a preferred embodiment of the present invention, when the viewer books a content item using the mobile PVR 320 EPG, a date specific unit of metadata is activated, in order to set the reminder described above. The date specific unit of metadata would preferably comprise that date and time before which synchronization must occur in order for the content items booked on the mobile PVR 320 to be recorded on the base PVR 300 and transferred to the mobile PVR 320 for viewing.

It is appreciated that content and data synchronization occurs between the base PVR 300 and the mobile PVR 320 whether wirelessly or over a cable. Without limiting the generality of the foregoing, it is further appreciated that when synchronization occurs over a cable the connection may be, for example, over USB, Firewire, or Ethernet. Synchronization may also preferably occur over the Internet, over the POTS (Plain Old Telephone Service) telephone network, or over a cell phone network. It is also appreciated that the mobile PVR 320 may comprise rechargeable batteries that are recharged in at least one of the following manners:

in a recharging "cradle";
    over a USB cable, preferably the same USB cable used to synchronize data; and
    by connection to power mains or a transformer connected to the power mains.

Figure 7:
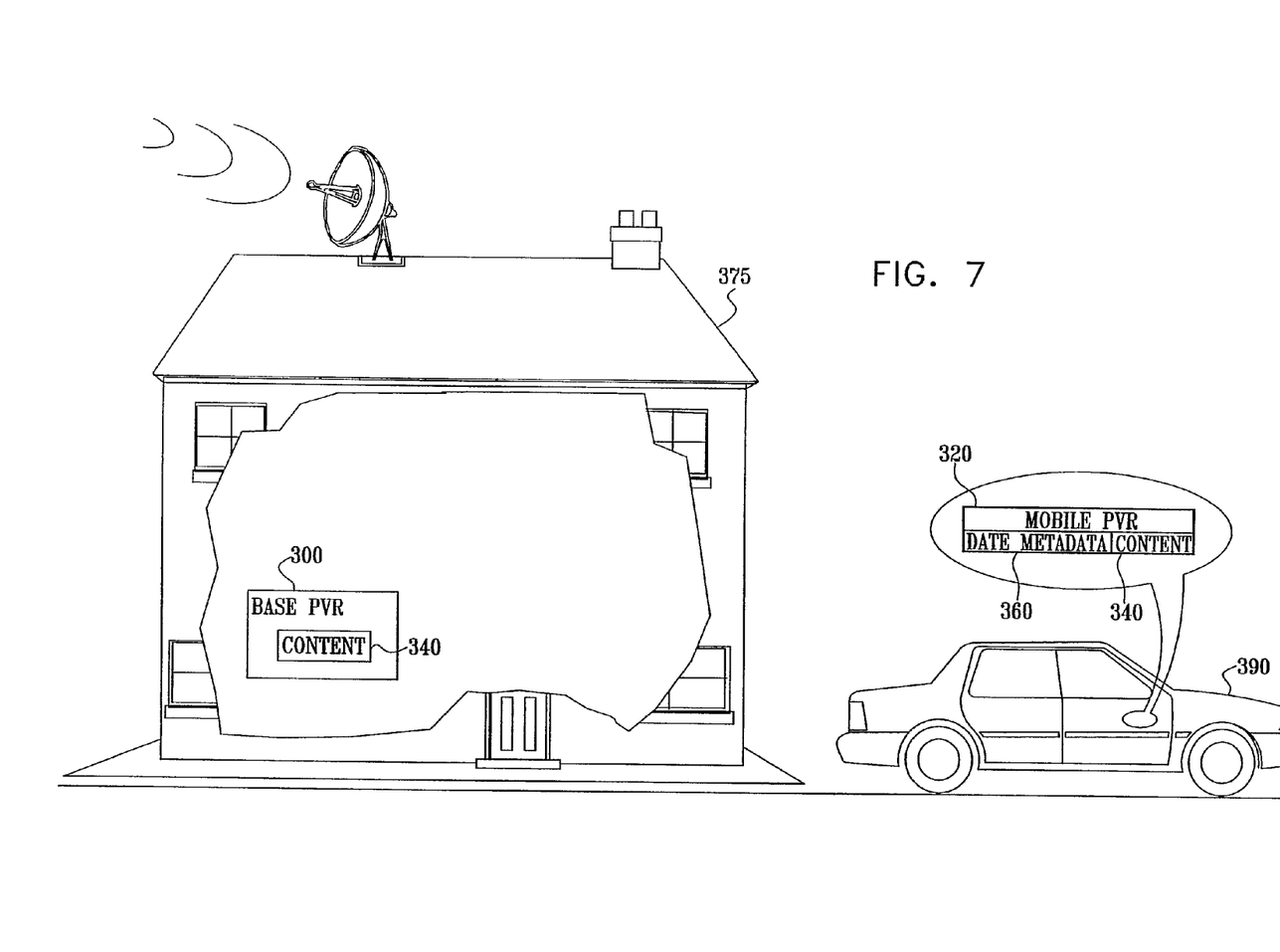
FIG. 7 is a simplified partly pictorial, partly block diagram illustration of the mobile PVR of FIGS. 1A-1B when located remotely to the base PVR.

Reference is now made to FIG. 7, which is a simplified partly pictorial, partly block diagram illustration of the mobile PVR of FIGS. 1A-1B when located remotely to the base PVR. In FIG. 7, the base PVR 300 remains in the house 375. The base PVR 300 still stores content item 340. In a separate location, pictured here, for illustrative purposes only, as a car 390, the mobile PVR 320 is no longer synchronizing with the base PVR 300. The content item 340, as well as date metadata 360, are stored in the mobile PVR 320.

A viewer viewing content on the mobile PVR 320 may preferably hold the mobile PVR 320 in the viewer's lap. The mobile PVR 320 is preferably designed to ensure proper heat dissipation so that the mobile PVR 320 will not overheat, thereby causing discomfort to the viewer holding the mobile PVR 320 in the viewer's lap.

The mobile PVR 320 preferably has a spring-loaded retractable looping wire with a release. The wire can be used to hang the unit over a headrest in a car. Preferably, the mobile PVR also has a retractable "kick-stand". The kick-stand can be set up at several different angles and can rest against a back surface or on a flat surface.

The mobile PVR 320 is preferably configured so that if it is:
    in recording mode (transferring content from main PVR);
        or running on batteries (i.e. wireless),
it will preferably turn off when a configurable minimum battery charge is reached such as to guarantee a certain amount of playback time. For example, and without limiting the generality of the foregoing, if the mobile PVR 320 has already loaded 2 hours of unwatched content, and it only has enough battery for two hours of playback, it could turn itself off rather than continue recording.

Alternatively, the mobile PVR 320 may preferably comprise the content storage governor 435 (FIG. 4), which is preferably configured to take into account programming boundaries, as found in the EPG, in order to determine which content to record. For example, and without limiting the generality of the foregoing, if the mobile PVR 320 only has enough battery for one hour of playback, the content storage governor 435 (FIG. 4) will preferably allow content completely viewable in one hour or less to be preferably recorded, rather than content requiring more than one hour to view.

It is appreciated that criteria similar to the criteria used to determine which content to transfer to the mobile PVR 320 are preferably used to determine, when necessary, which content should be deleted from the mobile PVR 320.

Figure 8:
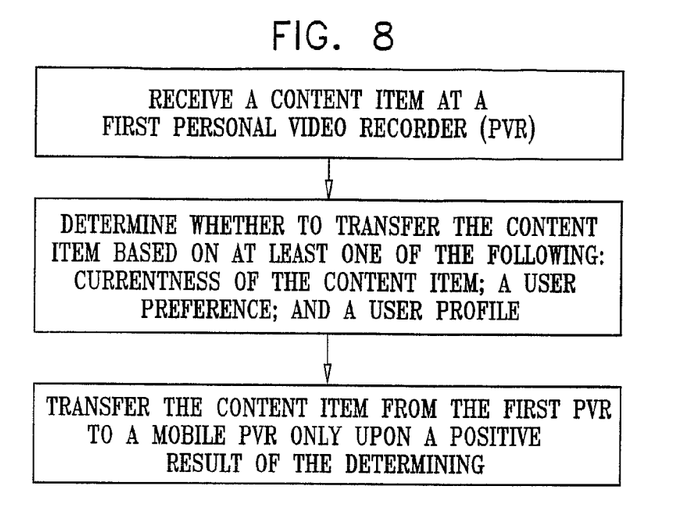
FIG. 8 is a simplified flowchart illustration of a preferred method of operation of the system of FIGS. 1A and 1B.

Reference is now made to FIG. 8, which is a simplified flowchart illustration of a preferred method of operation of the system of FIGS. 1A and 1B. The method of FIG. 8 is believed to be self explanatory.

Figure 9:
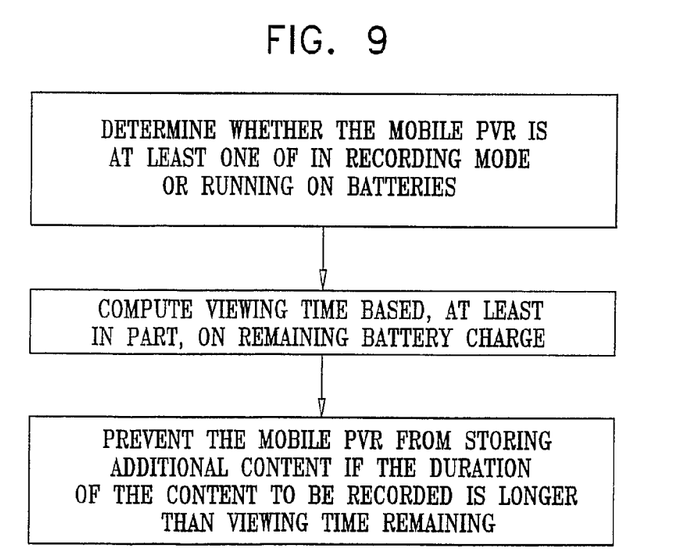
FIG. 9 is a simplified flowchart illustration of a preferred method of operation of an episodic synchronizer of FIG. 4.

Reference is now made to FIG. 9, which is a simplified flowchart illustration of a preferred method of operation of an episodic synchronizer of FIG. 4. The method of FIG. 9 is believed to be self explanatory.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method of digital television recording comprising:
   receiving a content item at a first Personal Video Recorder (PVR);
   determining whether to transfer the content item based on at least one of the following:
   groups to which a user is known to belong;
   user purchase history;
   user recording history;
   and
   broadcaster requirements;
   and
   synchronizing the first PVR to a mobile PVR, the synchronizing comprising:
      updating an electronic program guide (EPG);
      updating conditional access information; and
      transferring the content item from the first PVR to the mobile PVR only upon a positive result of the determining,
   wherein the EPG is cached on the mobile PVR to allow a user to book a recording of a program or a series of programs when the mobile PVR is not connected to the first PVR; and
   after booking a program or series of programs on the mobile PVR when the mobile PVR is synchronized with the first PVR the mobile PVR sends a booking request to the first PVR to instruct the first PVR to record the program or series of programs.

2. The method according to claim 1 and wherein the determining is based, at least in part, on currentness of the content item.

3. The method according to claim 1 and wherein the determining is based, at least in part, on a user preference.

4. The method according to claim 1 and wherein the determining is based, at least in part, on a user profile.

5. The method according to claim 1 and wherein the transferring occurs without user intervention.

6. The method according to claim 1 and wherein the transferring occurs in response to a user initiated request.

7. The method according to claim 3 and wherein the user preference comprises a plurality of individual user preferences.

8. The method according to claim 1 and wherein the mobile PVR comprises a plurality of individual mobile PVRs.

9. The method according to claim 1 and wherein the mobile PVR comprises a television tuner.

10. The method according to claim 1 and wherein the EPG is updateable in at least one of the following ways:
    wirelessly; and
    over a cable.

11. The method according to claim 1 and wherein the mobile PVR comprises a wireless remote control communication port, and also comprising:
    a remote control device, the wireless remote control communication port being operative to communicate with the remote control device.

12. The method according to claim 11 and wherein the wireless remote control communication port is an infra-red communication port.

13. The method according to claim 1 and wherein the content item comprises an advertisement.

14. The method according to of claim 1 and wherein the first PVR comprises a plurality of individual first PVRs.

15. The method of claim 1 wherein the determining whether to transfer the content item is based on at least groups to which the user is known to belong.

16. The method of claim 15 wherein the groups to which a user is known to belong comprise a demographic group.

17. The method of claim 15 wherein the groups to which a user is known to belong comprise a group based on where the user lives.

18. The method of claim 15 wherein the groups to which a user is known to belong comprise a group based on what age children the user may have.

19. The method of claim 15 wherein the groups to which a user is known to belong comprise a group based on the user's income.

20. The method of claim 15 wherein the groups to which a user is known to belong comprise a group based on the user's occupation.

21. The method of claim 1 wherein the determining whether to transfer the content item is based on at least user purchase history.

22. The method of claim 1 wherein the determining whether to transfer the content item is based on at least user recording history.

23. The method of claim 1 wherein the determining whether to transfer the content item is based on at least broadcaster requirements.

24. A digital television recording system comprising:
    a first Personal Video Recorder (PVR) operative to receive a content item, the first PVR comprising;
    a determining unit on the first PVR operative to determine whether to copy the content item based on at least one of the following:
    groups to which a user is known to belong;
    user purchase history;
    user recording history;
    and
    broadcaster requirements;
    and
    a synchronizer operative to synchronize the first PVR to a mobile PVR, the synchronizing comprising:
       updating an electronic program guide (EPG);
       updating conditional access information; and
       transferring the content item from the first PVR to the mobile PVR only upon a positive result of the determining,
    wherein the EPG is cached on the mobile PVR to allow a user to book a recording of a program or a series of programs when the mobile PVR is not connected to the first PVR; and
    after booking a program or series of programs on the mobile PVR when the mobile PVR is synchronized with the first PVR the mobile PVR sends a booking request to the first PVR to instruct the first PVR to record the program or series of programs.

25. A digital television recording system comprising:
    a first Personal Video Recorder (PVR) operative to receive a content item, the first PVR comprising;
    determining means comprised in the first PVR for determining whether to copy the content item based on at least one of the following:
    groups to which a user is known to belong;
    user purchase history;
    user recording history;
    and
    broadcaster requirements; and
    synchronizing means synchronizing from the first PVR to a mobile PVR, the synchronizing comprising:

updating an electronic program guide (EPG);
updating conditional access information; and
transferring the content item from the first PVR to the mobile PVR only upon a positive result of the determining, wherein the EPG is cached on the mobile PVR to allow a user to book a recording of a program or a series of programs when the mobile PVR is not connected to the first PVR; and after booking a program or series of programs on the mobile PVR when the mobile PVR is synchronized with the first PVR the mobile PVR sends a booking request to the first PVR to instruct the first PVR to record the program or series of programs.

26. A method of digital television recording comprising:

receiving a content item at a first Personal Video Recorder (PVR);

determining whether to transfer the content item based, at least in part, on at least one of the following:
groups to which a user is known to belong;
user purchase history; and
broadcaster requirements;

and synchronizing the first PVR to a mobile PVR, the synchronizing comprising:
updating an electronic program guide (EPG);
updating conditional access information; and
transferring the content item from the first PVR to the mobile PVR only upon a positive result of the determining, wherein the EPG is cached on the mobile PVR to allow a user to book a recording of a program or a series of programs when the mobile PVR is not connected to the first PVR; and after booking a program or series of programs on the mobile PVR when the mobile PVR is synchronized with the first PVR the mobile PVR sends a booking request to the first PVR to instruct the first PVR to record the program or series of programs.

* * * * *

UNITED STATES PATENT AND TRADEMARK OFFICE
CERTIFICATE OF CORRECTION

PATENT NO. : 8,559,795 B2  Page 1 of 1
APPLICATION NO. : 11/628677
DATED : October 15, 2013
INVENTOR(S) : Wachtfogel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1511 days.

Signed and Sealed this

Fifteenth Day of September, 2015

Michelle K. Lee
*Director of the United States Patent and Trademark Office*